US010830875B2

(12) United States Patent
Choi et al.

(10) Patent No.: US 10,830,875 B2
(45) Date of Patent: Nov. 10, 2020

(54) AUXILIARY APPARATUS FOR A LIGHTHOUSE POSITIONING SYSTEM

(71) Applicant: HTC CORPORATION, Taoyuan (TW)

(72) Inventors: Iok-Kan Choi, Taoyuan (TW);
Tsung-Han Wu, Taoyuan (TW);
Kuang-Wei Lin, Taoyuan (TW)

(73) Assignee: HTC CORPORATION, Taoyuan (TW)

(*) Notice: Subject to any disclaimer, the term of this patent is extended or adjusted under 35 U.S.C. 154(b) by 189 days.

(21) Appl. No.: 15/789,367

(22) Filed: Oct. 20, 2017

(65) Prior Publication Data

US 2018/0113199 A1    Apr. 26, 2018

Related U.S. Application Data

(60) Provisional application No. 62/410,405, filed on Oct. 20, 2016.

(51) Int. Cl.
*G06F 3/0346* (2013.01)
*G01S 17/06* (2006.01)
(Continued)

(52) U.S. Cl.
CPC .............. *G01S 7/484* (2013.01); *G01S 1/70* (2013.01); *G01S 1/7034* (2019.08);
(Continued)

(58) Field of Classification Search
CPC ........ G06F 3/0346; G01S 17/06; G01S 17/87; G01S 17/88; G01S 1/70; G01S 5/16;
(Continued)

(56) References Cited

U.S. PATENT DOCUMENTS 3,636,836 A  *  1/1972  Maddox  ................. H01J 9/2272
                                                        396/546
6,081,230 A  *  6/2000  Hoshino  ............... G01C 21/165
                                                       342/357.32
(Continued)

FOREIGN PATENT DOCUMENTS

CN          103543439 A          1/2014
CN          105183166 A   *    12/2015
(Continued)

OTHER PUBLICATIONS

TIPO First Office Action corresponding to Application No. 10720797620; dated Aug. 29, 2018.
(Continued)

*Primary Examiner* — John E Breene
*Assistant Examiner* — Jeffrey P Aiello
(74) *Attorney, Agent, or Firm* — Cantor Colburn LLP

(57) ABSTRACT

An auxiliary apparatus for a lighthouse positioning system is provided. The lighthouse positioning system includes a first positioning base station and a second positioning base station, wherein the first positioning base station includes a first signal transmitter and a second signal transmitter and the second positioning base station includes a first signal transmitter and a second signal transmitter. The auxiliary apparatus calculates a first signal time sequence of the first signal transmitters, calculates a second signal time sequence of the second signal transmitters, and determines a third signal time sequence according to the first signal time sequence and the second signal time sequence. The third signal time sequence is not overlapped with the first signal time sequence and the second signal time sequence. The auxiliary apparatus transmits a plurality of signals according to the third signal time sequence.

11 Claims, 4 Drawing Sheets

(51) Int. Cl.
  *G01S 17/88* (2006.01)
  *G01S 7/484* (2006.01)
  *G01S 7/481* (2006.01)
  *G01S 1/70* (2006.01)
  *G01S 7/487* (2006.01)
  *G01S 17/87* (2020.01)
  *G01S 5/16* (2006.01)

(52) U.S. Cl.
  CPC .............. *G01S 1/7038* (2019.08); *G01S 5/16* (2013.01); *G01S 7/4817* (2013.01); *G01S 7/4876* (2013.01); *G01S 17/06* (2013.01); *G01S 17/87* (2013.01); *G01S 17/88* (2013.01); *G06F 3/0346* (2013.01); *G01S 2201/01* (2019.08)

(58) Field of Classification Search
  CPC .... G01S 7/484; G05D 1/0234; G05D 1/0242; G05D 1/0225
  USPC ......... 340/5.61; 341/173; 345/175; 370/329; 375/219, 295; 702/150, 158, 176
  See application file for complete search history.

(56) References Cited

U.S. PATENT DOCUMENTS

| | | | |
|---|---|---|---|
| 6,216,087 | B1 | 4/2001 | Want et al. |
| 8,787,323 | B2* | 7/2014 | Laroia ................ H04L 5/0035 370/336 |
| 2004/0236470 | A1* | 11/2004 | Dooley ................ G05D 1/0022 700/255 |
| 2009/0238402 | A1* | 9/2009 | Satzger .................. B23Q 17/24 382/100 |
| 2009/0245803 | A1 | 10/2009 | Garner et al. |
| 2009/0299632 | A1* | 12/2009 | Hawes ................ B60R 21/0134 701/300 |
| 2011/0310220 | A1 | 12/2011 | McEldowney |
| 2012/0169497 | A1* | 7/2012 | Schnittman ............ A47L 9/106 340/540 |
| 2012/0194650 | A1 | 8/2012 | Izadi et al. |
| 2015/0339952 | A1* | 11/2015 | Glazer .................. G09B 23/24 434/298 |
| 2015/0373322 | A1 | 12/2015 | Goma et al. |
| 2018/0313937 | A1* | 11/2018 | Dai .......................... G01S 1/70 |

FOREIGN PATENT DOCUMENTS

| | | |
|---|---|---|
| CN | 105183166 A | 12/2015 |
| CN | 105974359 A | 9/2016 |
| WO | 2015107529 A1 | 7/2015 |

OTHER PUBLICATIONS

Extended European Search Report corresponding to Application No. 17197545.1-1206; dated Mar. 22, 2018.
TIPO Second Office Action corresponding to TW10720797620; dated Apr. 15, 2019.
SIPO First Office Acion corresponding to CN Application No. 201710997235.6 dated Jan. 15, 2020.
SIPO First Office Action corresponding to CN Application No. 201710997235.6 dated Jan. 15, 2020.

\* cited by examiner

AUXILIARY APPARATUS FOR A LIGHTHOUSE POSITIONING SYSTEM

CROSS-REFERENCES TO RELATED APPLICATIONS

This application claims the benefit of U.S. Provisional Application Ser. No. 62/410,405 filed on Oct. 20, 2016, which are hereby incorporated by reference in its entirety.

[BACKGROUND OF THE INVENTION] The present invention relates to an auxiliary apparatus. More particularly, the present invention relates to an auxiliary apparatus for a lighthouse positioning system.

DESCRIPTION OF THE RELATED ART

In the Virtual Reality (VR) technology, it is an important issue to correctly and rapidly determine a position of a user in a physical space and detect depth information of the physical space in order to simulate them in a three-dimensional virtual environment.

A virtual reality positioning technology that has brought people's attention is the lighthouse positioning technology, which determines the position of a trackable apparatus worn by a user (e.g., a Head-Mounted Display (HMD)) by two positioning base stations and, thereby, determines the position of the user. Briefly speaking, the two positioning base stations operate in turns, and each positioning base station transmits a synchronous signal by a first signal transmitter (e.g., an infrared light emitting diode (IR LED)) and then scans the physical space with a beam (e.g., a laser beam) generated by a second signal transmitter in its sweep cycle. The trackable apparatus comprises a plurality of sensors to sense the synchronous signals and the beams transmitted by the positioning base stations. A host at the back end calculates the position of the trackable apparatus in the physical space according to the synchronous signals and the beams sensed by the trackable apparatus and then simulates the position in the three-dimensional virtual environment.

Although the lighthouse positioning technology can accurately determine the position of the trackable apparatus in a physical space, a technology that can detect the depth information of the physical space as well as cooperate with the lighthouse positioning technology is unavailable. Therefore, detecting the depth information when adopting the lighthouse positioning technology is an urgent issue to be solved.

SUMMARY OF THE INVENTION

An objective of the present invention is to provide an auxiliary apparatus for a lighthouse positioning system. The lighthouse positioning system comprises a first positioning base station and a second positioning base station, wherein the first positioning base station comprises a first signal transmitter and a second signal transmitter and the second positioning base station comprises a first signal transmitter and a second signal transmitter. The auxiliary apparatus comprises a processor and a signal transmitter, wherein they are electrically connected with each other. The processor is configured to calculate a first signal time sequence of the first signal transmitters according to a plurality of sets of first sensed signals and calculate a second signal time sequence of the second signal transmitters according to a plurality of sets of second sensed signals. Each set of first sensed signals is sensed from one of the first signal transmitters, while each set of second sensed signals is sensed from one of the second signal transmitters. The processor determines a third signal time sequence according to the first signal time sequence and the second signal time sequence, wherein the third signal time sequence is not overlapped with the first signal time sequence and the second signal time sequence. The signal transmitter is configured to transmit a plurality of signals according to the third signal time sequence.

Another objective of the present invention is to provide an auxiliary apparatus for a lighthouse positioning system. The lighthouse positioning system comprises a first positioning base station and a second positioning base station, wherein the first positioning base station comprises a first signal transmitter and a second signal transmitter and the second positioning base station comprises a first signal transmitter and a second signal transmitter. The auxiliary apparatus comprises a processor and a signal transmitter, wherein they are electrically connected with each other. The processor is configured to determine that at least one first interference value caused by a plurality of sets of first sensed signals to the signal transmitter is greater than a threshold, determine that at least one second interference value caused by a plurality of sets of second sensed signals to the signal transmitter is less than the threshold, calculate a first signal time sequence of the first signal transmitters according to the sets of first sensed signals, and determine a second signal time sequence according to the first signal time sequence. Each set of first sensed signals is sensed from one of the first signal transmitters, each set of second sensed signals is sensed from one of the second signal transmitters, and the second signal time sequence is not overlapped with the first signal time sequence.

The auxiliary apparatus provided by the present invention avoids using all the signal time sequences used by the lighthouse positioning system or avoid using the signal time sequences used by the lighthouse positioning system that will cause higher interferences. In this way, the signal transmitted by the auxiliary apparatus will not interfere with the lighthouse positioning system. Moreover, since the auxiliary apparatus knows its own signal time sequence, it will not be interfered by the signal transmitted from the lighthouse positioning system. With the auxiliary apparatus of the present invention, adopting the highly-accurate lighthouse positioning technology and detecting the depth information in a physical space can be achieved together.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, auxiliary apparatuses for a lighthouse positioning system provided in the present invention will be explained with reference to embodiments thereof. However, these embodiments are not intended to limit the present invention to any environment, applications, or implementations described in these embodiments. Therefore, description of these embodiments is only for purpose of illustration rather than to limit the scope of the present invention. It shall be appreciated that, in the following embodiments and the attached drawings, elements unrelated to the present invention are omitted from depiction. In addition, dimensions of elements and dimensional relationships among individual elements in the attached drawings are only for the purpose of illustration, but not to limit the scope of the present invention.

Figure 1A:
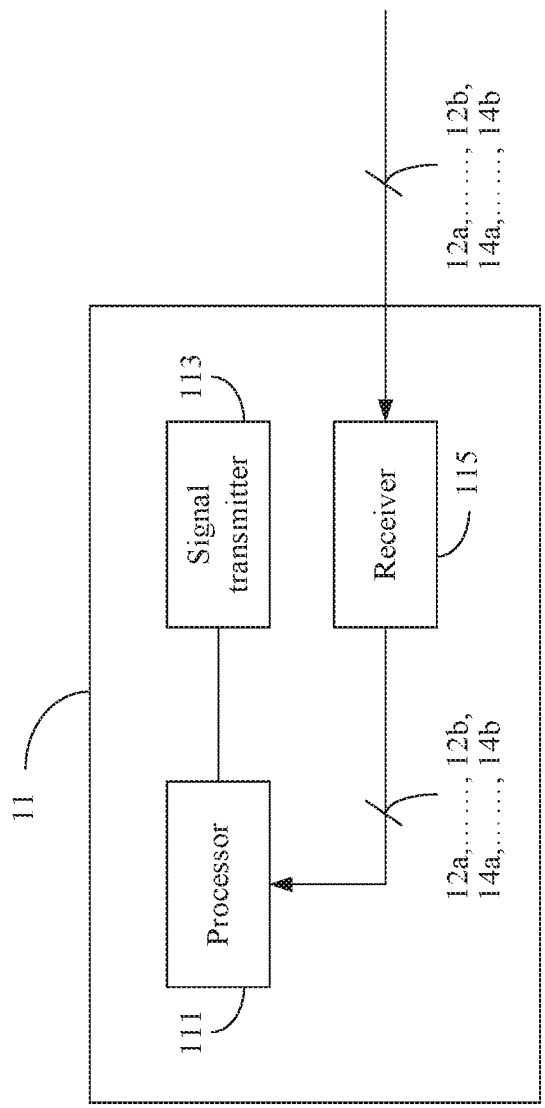
FIG. 1A is a schematic view depicting the architecture of an auxiliary apparatus 11 of a first embodiment.

A first embodiment of the present invention is an auxiliary apparatus 11 for a lighthouse positioning system, and a schematic view of which is depicted in FIG. 1A. The auxiliary apparatus 11 comprises a processor 111, a signal transmitter 113, and a receiver 115, wherein the processor 111 is electrically connected to the signal transmitter 113 and the receiver 115. The processor 111 may be any of various processors, central processing units (CPUs), microprocessors, or other computing devices well known to those of ordinary skill in the art. The signal transmitter 113 may be any of various apparatuses capable of transmitting signals (e.g., an infrared laser transmitter, but not limited thereto). The receiver 115 may be any of various apparatuses capable of receiving signals and data. In this embodiment, the auxiliary apparatus 11 is an apparatus capable of measuring depth information of a physical space. For example, the auxiliary apparatus 11 may be a depth camera, but it is not limited thereto.

Figure 1B:
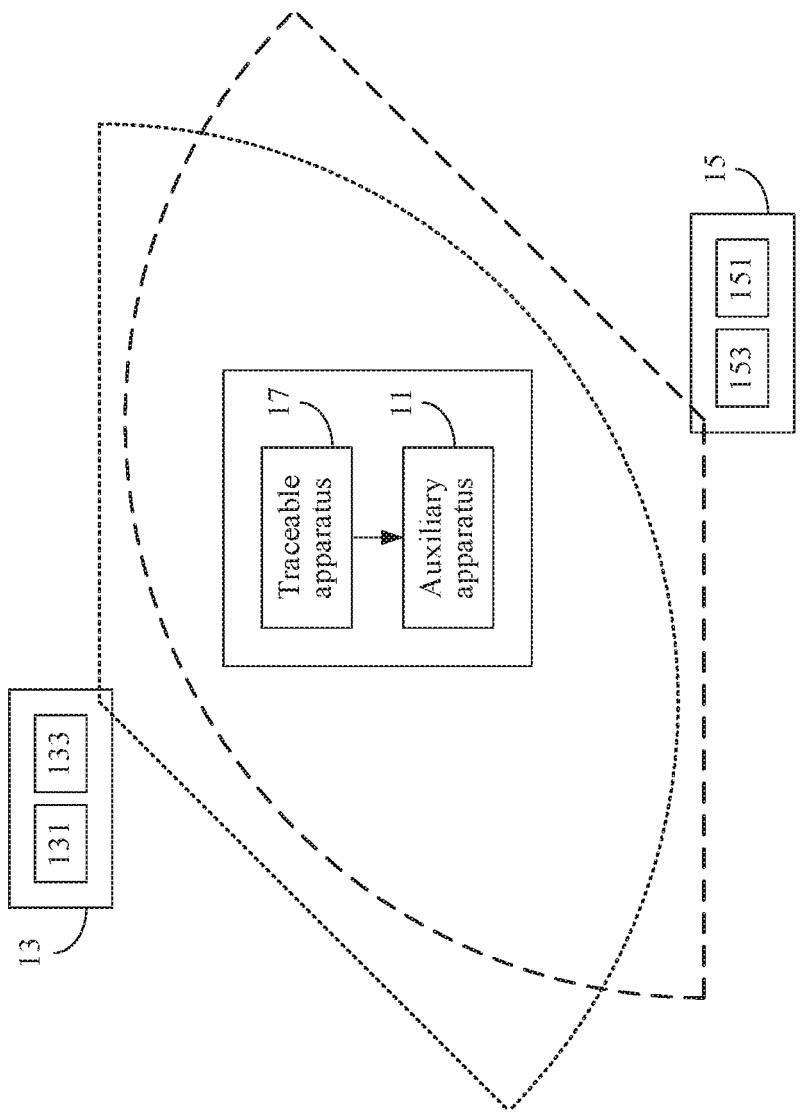
FIG. 1B is a schematic view depicting that the auxiliary apparatus 11 and a lighthouse positioning system are disposed in a physical space for use in combination.

FIG. 1B is a schematic view depicting that the auxiliary apparatus 11 and a lighthouse positioning system are used in a physical space together. Please note that FIG. 1B is a top view of the physical space, and the specific example shown in FIG. 1B is not intended to limit the scope of the present invention. The lighthouse positioning system comprises two positioning base stations 13 and 15 and a trackable apparatus 17. The positioning base station 13 comprises a first signal transmitter 131 and a second signal transmitter 133, while the positioning base station 15 comprises a first signal transmitter 151 and a second signal transmitter 153. For example, each of the first signal transmitters 131 and 151 may be an infrared light emitting diode (IR LED), each of the second signal transmitters 133 and 153 may be an infrared (IR) laser emitter, and the auxiliary apparatus 11 may be an apparatus utilizing infrared rays (e.g., a depth camera).

Figure 1C:
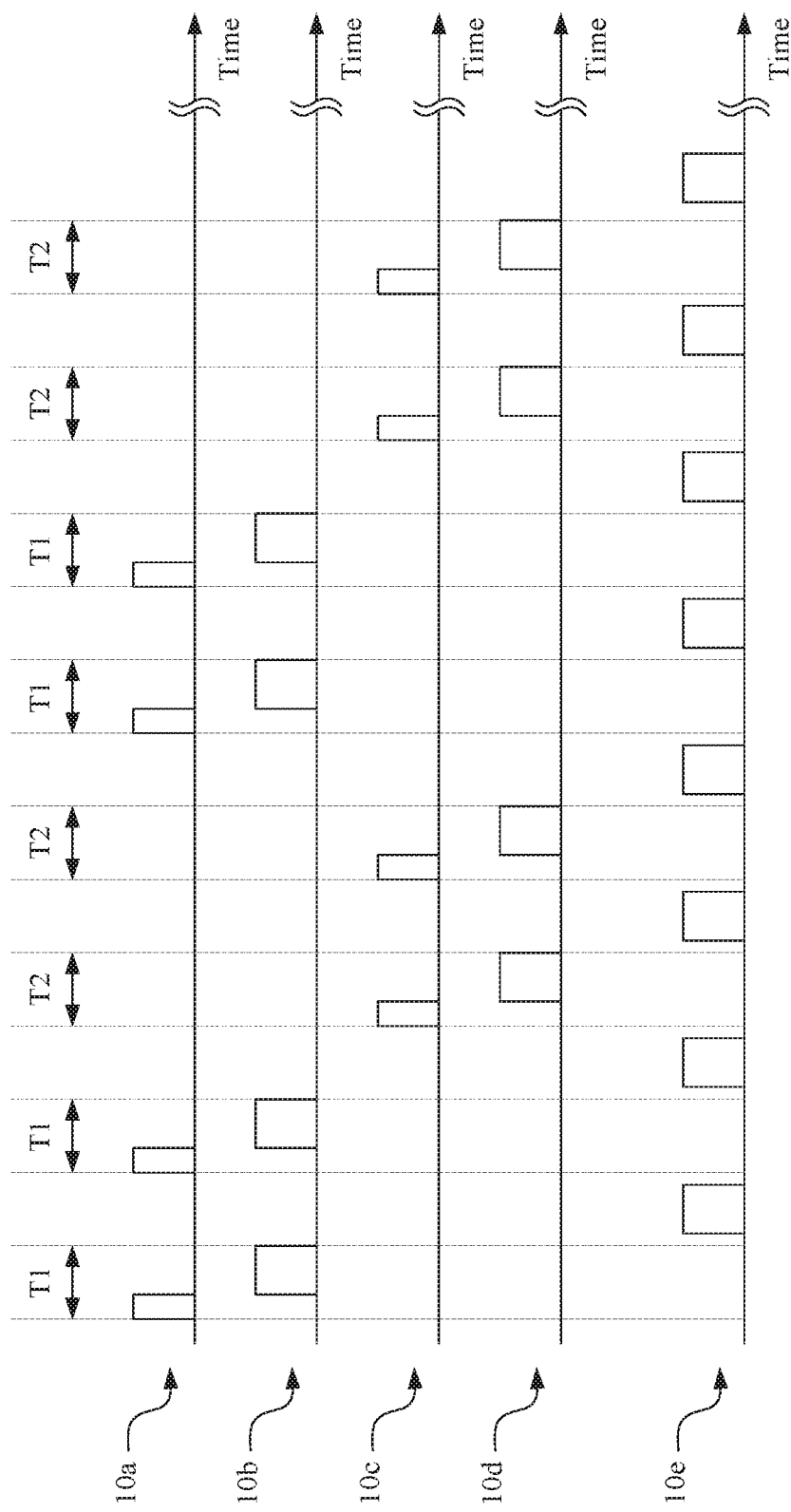
FIG. 1C is a diagram showing signal time sequences of the first embodiment.

The positioning base station 13 transmits a synchronous signal by the first signal transmitter 131 and then transmits a signal (e.g., a beam) by the second signal transmitter 133 to scan the physical space in its every sweep cycle T1. Similarly, the positioning base station 15 transmits a synchronous signal by the first signal transmitter 151 and then transmits a signal (e.g., a beam) by the second signal transmitter 153 to scan the physical space in its every sweep cycle T2. FIG. 1C depicts the signal time sequences 10a, 10b, 10c, and 10d, which respectively correspond to the first signal transmitter 131, the second signal transmitter 133, the first signal transmitter 151, and the second signal transmitter 153. The trackable apparatus 17 comprises a plurality of sensors (not shown) for sensing signals transmitted by the first signal transmitters 131 and 151 and the second signal transmitters 133 and 153. For example, the trackable apparatus 17 may be a head-mounted display (HMD), but it is not limited thereto.

It shall be appreciated that the details regarding the operations of the lighthouse positioning system are not the focus of the present invention and, thus, will not be further described herein. The following descriptions will focus on the technical problems that have to be solved when using the auxiliary apparatus 11 and the lighthouse positioning system together and the corresponding technical solutions.

As described previously, the auxiliary apparatus 11 is an apparatus capable of measuring depth information of a physical space. The auxiliary apparatus 11 calculates the depth information by the following operations, including transmitting a signal (e.g., infrared rays) by the signal transmitter 113, sensing a reflected signal by its sensor (not shown), and then calculating the depth information according to the sensed reflected signal. Since the auxiliary apparatus 11 and the lighthouse positioning system are disposed in the same physical space, the time point for the auxiliary apparatus 11 to transmit signals must be arranged properly so that the auxiliary apparatus 11 and the lighthouse positioning system will not interfere with each other.

In this embodiment, the auxiliary apparatus 11 and the trackable apparatus 17 are integrated as one apparatus. The receiver 115 of the auxiliary apparatus 11 receives a plurality of sets of sensed signals $12a, \ldots, 12b$ and a plurality of sets of sensed signals $14a, \ldots, 14b$ from the trackable apparatus 17. Each set of the sets of sensed signals $12a, \ldots, 12b$ is sensed from the first signal transmitter 131 or the first signal transmitter 151, while each set of the sets of sensed signals $14a, \ldots, 14b$ is sensed from the second signal transmitter 133 or the second signal transmitter 153. Please note that, in other embodiments, the auxiliary apparatus 11 and the trackable apparatus 17 may be not integrated. In these embodiments, the auxiliary apparatus 11 comprises at least one sensor (not shown) electrically connected with the processor 111 to receive the sets of sensed signals $12a, \ldots, 12b$ and $14a, \ldots, 14b$.

The processor 111 of the auxiliary apparatus 11 calculates the signal time sequences 10a and 10c of the first signal transmitters 131 and 151 according to the sets of sensed signals $12a, \ldots, 12b$ as shown in FIG. 1C. Moreover, the processor 111 calculates the signal time sequences 10b and 10d of the second signal transmitters 133 and 153 according to the sets of sensed signals $14a, \ldots, 14b$ as shown in FIG. 1C. Next, the processor 111 determines a signal time sequence 10e that is not overlapped with the signal time sequences 10a and 10c and the signal time sequences 10b and 10d according to the signal time sequences 10a and 10c and the signal time sequences 10b and 10d as shown in FIG. 1C. Thereafter, the signal transmitter 113 can transmit a plurality of signals according to the signal time sequence 10e. When the auxiliary apparatus 11 is a depth camera using infrared rays, the auxiliary apparatus 11 may operate in the time periods corresponding to the signal time sequence 10e (i.e., the signal transmitter 113 may transmit a plurality of signals in the time period corresponding to the signal time sequence 10e, and the receiver 115 or at least one sensor may receive/sense sets of sensed signals in the time period corresponding to the signal time sequence 10e in order to measure the depth information of the physical space accordingly).

Since the signal time sequence 10e used by the auxiliary apparatus 11 is not overlapped with the signal time sequences 10a and 10c and the signal time sequences 10b and 10d, the signals transmitted by the auxiliary apparatus 11 will not interfere with those of the lighthouse positioning system. Specifically, a host/computer of the lighthouse positioning system determines the signal time sequences 10a, 10b, 10c, and 10d corresponding to the first signal transmitter 131, the second signal transmitter 133, the first signal transmitter 151, and the second signal transmitter 153 respectively, and transmits information related to the signal time sequences 10a, 10b, 10c, and 10d to the trackable apparatus 17. The trackable apparatus 17 knows that it will use the signal time sequences 10a, 10b, 10c, and 10d, so it will ignore signals transmitted in the time periods corresponding to the signal time sequence 10e. Moreover, the auxiliary apparatus 11 knows that it should transmits signals according to the signal time sequence 10e, so it will also not be disturbed by the signals transmitted by the lighthouse positioning system. With the auxiliary apparatus 11 provided in the first embodiment, adopting the highly-accurate lighthouse positioning technology and detecting the depth information in a physical space can be achieved together.

Figure 2:
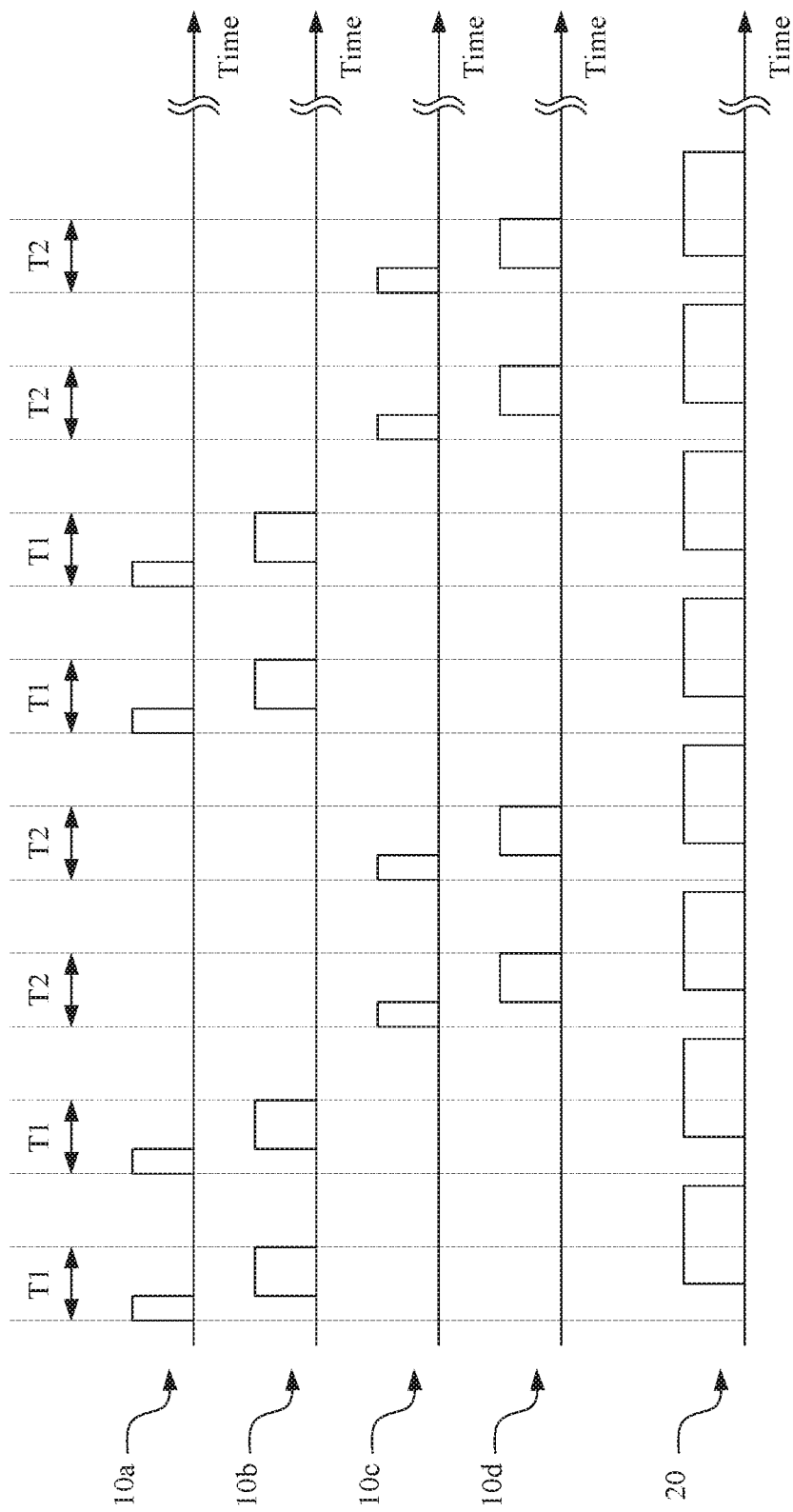
FIG. 2 is a diagram showing signal time sequences of a second embodiment.

Please refer to FIG. 1A and FIG. 2 for a second embodiment of the present invention. In the second embodiment, the operations, functions, and technical effects that can be achieved by the auxiliary apparatus 11 are generally the same as those of the first embodiment. The main differences between the first embodiment and the second embodiment lie in the way that the auxiliary apparatus 11 determines the signal time sequence used by the signal transmitter 113 and the signal time sequence being determined. The following description will only focus on the differences between the second embodiment and the first embodiment.

In this embodiment, the processor 111 determines whether at least one first interference value caused by the sets of sensed signals 12a, ... , 12b to the signal transmitter 113 is greater than a threshold and whether at least one second interference value caused by the sets of sensed signals 14a, ... , 14b to the signal transmitter 113 is greater than the threshold. When the processor 111 determines the signal time sequence for the signal transmitter 113 afterward, the processor 111 will avoid the time periods/signal time sequences that would cause a high interference.

Herein, it is assumed that the processor 111 determines that the at least one first interference value caused by the sets of sensed signals 12a, ... , 12b is greater than the threshold, while the at least a second interference value caused by the sets of sensed signals 14a, ... , 14b is less than the threshold. Since the at least one first interference value caused by the sets of sensed signals 12a, ... , 12b is greater than the threshold and each set of the sets of sensed signals 12a, ... , 12b is sensed from the first signal transmitter 131 or the first signal transmitter 151, the signal time sequences 10a and 10c used by the first signal transmitters 131 and 151 have to be avoided as shown in FIG. 2. Specifically, the processor 111 calculates the signal time sequences 10a and 10c of the first signal transmitters 131 and 151 according to the sets of sensed signals 12a, ... , 12b and then determines a signal time sequence 20 that is not overlapped with the signal time sequences 10a and 10c according to the signal time sequences 10a and 10c as shown in FIG. 2. Thereafter, the signal transmitter 113 can transmit a plurality of signals according to the signal time sequence 20. When the auxiliary apparatus 11 is a depth camera using infrared rays, the auxiliary apparatus 11 may operate in the time period corresponding to the signal time sequence 20 (i.e., the signal transmitter 113 may transmit a plurality of signals in the time period corresponding to the signal time sequence 20, and the receiver 115 or at least one sensor may receive/sense sets of sensed signals in the time period corresponding to the signal time sequence 20 in order to measure the depth information of the physical space accordingly).

In this embodiment, the processor 111 only avoids the time periods/signal time sequences that would cause a higher interference when the processor 111 determines the signal time sequence for the signal transmitter 113. Therefore, the signal time sequence 20 used by the signal transmitter 113 of the auxiliary apparatus 11 may be partially overlapped with the signal time sequences 10b and 10d used by the second signal transmitters 133 and 153 as shown in FIG. 2. In some embodiments, the signal transmitters using the overlapped signal time sequences may use different wavelengths (i.e., adopt the frequency-division technology) to maintain accurate positioning effect and detecting correct depth information. Specifically, the second signal transmitters 133 and 153 may use a first wavelength, the signal transmitter 113 may use a second wavelength, and the first wavelength is different from the second wavelength.

The above descriptions are based on the example that the at least one first interference value caused by the sets of sensed signals 12a, ... , 12b is greater than the threshold and the at least one second interference value caused by the sets of sensed signals 14a, ... , 14b is less than the threshold. Based on the above descriptions, a person of ordinary skill in the art shall appreciate how the auxiliary apparatus 11 determines the signal time sequence for the signal transmitter 113 when the at least one first interference value caused by the sets of sensed signals 12a, ... , 12b is less than the threshold and the at least one second interference value caused by the sets of sensed signals 14a, ... , 14b is greater than the threshold. Thus, the details will not be further described herein.

According to the above descriptions, the auxiliary apparatus 11 will avoid the time periods/signal time sequences that would cause a higher interference when it determines the signal time sequence for the signal transmitter 113. Consequently, the signals transmitted by the auxiliary apparatus 11 will not cause significant interference to the lighthouse positioning system. When the frequency-division technology is further adopted, the lighthouse positioning system can maintain the accurate positioning effect and the auxiliary apparatus 11 can obtain more accurate depth information. With the auxiliary apparatus 11 provided in the second embodiment, adopting the highly-accurate lighthouse positioning technology and detecting the depth information in a physical space can be achieved together.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

The invention claimed is:

1. An auxiliary apparatus for a lighthouse positioning system, the lighthouse positioning system comprising a first positioning base station and a second positioning base station, the first positioning base station comprising a first signal transmitter and a second signal transmitter, the second positioning base station comprising a first signal transmitter and a second signal transmitter, and the auxiliary apparatus comprising:

a processor, being configured to calculate a first signal time sequence of the first signal transmitters according to a plurality of sets of first sensed signals, calculate a second signal time sequence of the second signal transmitters according to a plurality of sets of second sensed signals, and determine a third signal time sequence according to the first signal time sequence and the second signal time sequence, wherein each set of first sensed signals is sensed from one of the first signal transmitters, each set of second sensed signals is sensed from one of the second signal transmitters, and the third signal time sequence is not overlapped with the first signal time sequence and the second signal time sequence; and a signal transmitter, being electrically connected with the processor and configured to transmit a plurality of signals according to the third signal time sequence.

2. The auxiliary apparatus of claim 1, further comprising:
a receiver, being electrically connected with the processor and configured to receive the sets of first sensed signals and the sets of second sensed signals from a trackable apparatus included in the lighthouse positioning system.

3. The auxiliary apparatus of claim 1, further comprising:
at least one sensor, being electrically connected with the processor and configured to sense the sets of first sensed signals and the sets of second sensed signals.

4. The auxiliary apparatus of claim 1, wherein each of the first signal transmitters is an infrared light emitting diode (IR LED), each of the second signal transmitters is an infrared laser emitter, and the auxiliary apparatus is an apparatus utilizing infrared rays.

5. The auxiliary apparatus of claim 4, wherein the auxiliary apparatus is a depth camera.

6. An auxiliary apparatus for a lighthouse positioning system, the lighthouse positioning system comprising a first positioning base station and a second positioning base station, the first positioning base station comprising a first signal transmitter and a second signal transmitter, the second positioning base station comprising a first signal transmitter and a second signal transmitter, and the auxiliary apparatus comprising:

a signal transmitter; and
a processor, being electrically connected with the signal transmitter and configured to determine that at least one first interference value caused by a plurality of sets of first sensed signals to the signal transmitter is greater than a threshold, determine that at least one second interference value caused by a plurality of sets of second sensed signals to the signal transmitter is less than the threshold, calculate a first signal time sequence of the first signal transmitters according to the sets of first sensed signals, and determine a second signal time sequence according to the first signal time sequence, wherein each set of first sensed signals is sensed from one of the first signal transmitters, each set of second sensed signals is sensed from one of the second signal transmitters, and the second signal time sequence is not overlapped with the first signal time sequence;

wherein the signal transmitter transmits a plurality of signals according to the second signal time sequence.

7. The auxiliary apparatus of claim 6, further comprising:
a receiver, being electrically connected with the processor and configured to receive the sets of first sensed signals and the sets of second sensed signals from a trackable apparatus included in the lighthouse positioning system.

8. The auxiliary apparatus of claim 6, further comprising:
at least one sensor, being electrically connected with the processor and configured to sense the sets of first sensed signals and the sets of second sensed signals.

9. The auxiliary apparatus of claim 6, wherein wavelengths used by the second signal transmitters are different from a wavelength used by the signal transmitter included in the auxiliary apparatus.

10. The auxiliary apparatus of claim 6, wherein each of the first signal transmitters is an infrared light emitting diode (IR LED), each of the second signal transmitters is an infrared laser emitter, and the auxiliary apparatus is an apparatus utilizing infrared rays.

11. The auxiliary apparatus of claim 10, wherein the auxiliary apparatus is a depth camera.

* * * * *